July 2, 1968   B. B. JOHANNSEN   3,390,726
DISK PLOW
Filed May 21, 1965   2 Sheets-Sheet 1

INVENTOR.
BRUNO B.
JOHANNSEN
By
J. C. Thompson
ATTORNEY

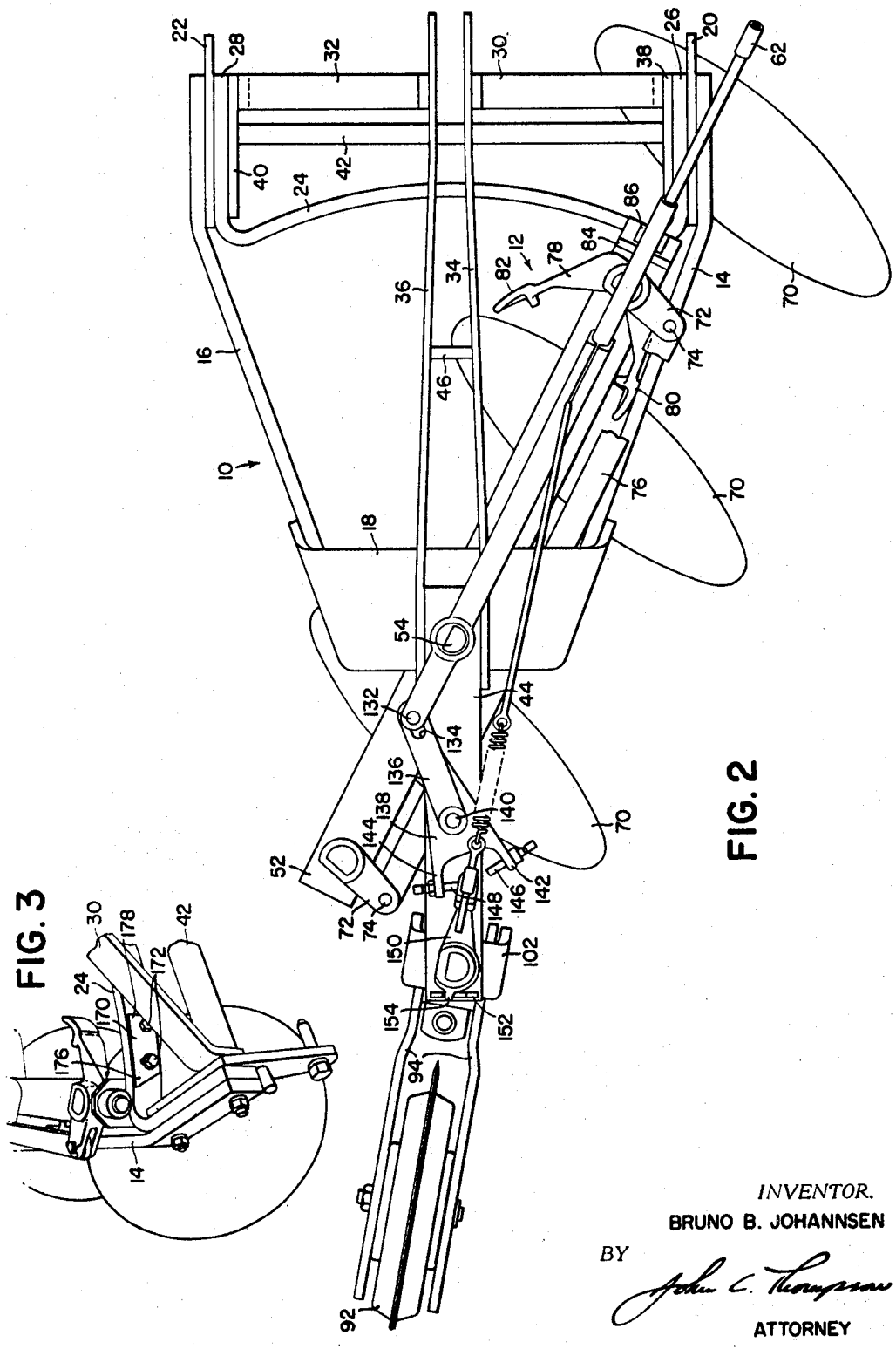

3,390,726
DISK PLOW
Bruno B. Johannsen, Moline, Ill., assignor to Deere & Company, Moline, Ill., a corporation of Delaware
Filed May 21, 1965, Ser. No. 457,634
12 Claims. (Cl. 172—212)

ABSTRACT OF THE DISCLOSURE

A reversible disk plow including a main frame having a pair of side rails a subframe having a spindle journaled on the main frame for swinging movement between right-hand and left-hand working positions and means to swing the subframe from one working position to the other. A plurality of disk plow standards are journaled on the subframe for simultaneous rotational movement between two positions, and a crank rotatably mounted on one of the standards and having arms selectively engageable with the side rails when the subframe is in one of its working positions holds the disk standards in one of their two positions.

---

This invention relates to agricultural implements, and more particularly to reversible disk plows of the type having a swingable beam which is adapted to be swung from a righhand plowing position to a left-hand plowing position, the beam carrying one or more plowing disks that are angularly adjustable about a generally vertical axis to dispose them in proper plowing position depending upon the position of the beam.

It is the principal object of the present invention to provide novel means for angling the disk plow standards in respnose to swinging movement of the plow beam. More particularly, it is an object of the present invention to provide in a disk plow having a main frame and a swingable subframe, means to rotate the disk plow standards carried by the swingable subframe which are engageable with the sides of the main frame when the swingable subframe is in its working position, the contact between the main frame and the swinging means positioning the disk standards.

Another object of the present invention is to provide a crank mounted upon a disk standard that is carried in a swingable subframe, the crank being engageable with the main frame of the plow to rotatably position the disk standard.

Another object of the present invention is to provide a reversible disk plow having a swingable subframe carried by a main frame and a plurality of disk standards carried by the subframe and means to rotatably position the disk standards within the subframe as the subframe is swung from one position to the other, the means contacting the main frame and normally being held in engagement with the main frame by soil pressure as the disk plow is propelled forwardly.

A still further object of the present invention is to provide a subframe lock to normally hold the subframe in one of its two working positions.

Another object of the present invention is to provide spring means to assist in swinging the subframe of a reversible disk plow from a neutral position to one of right- and left-hand working positions.

Another object of the present invention is to provide means mountable on the means to rotate disk standards carried by a subframe of a reversible disk plow to vary the width of cut of the plow.

Another object of the present invention is to provide in a reversible disk plow having a swingable beam and a rear furrow wheel which is mounted for swinging between right- and left-hand lead positions novel means whereby the degree of lead in each of the right- and left-hand positions can be individually adjusted. More particularly it is an object to provide linkage means interconnecting the spindle and shaft about which the subframe and furrow wheel are adapted to swing, respectively, the linkage means having adjustable stops whereby the degree of lead may be varied.

These and other objects and advantages of this invention will be apparent to those skilled in the art after a consideration of the following detailed description, taken in conjunction with the accompanying drawings, in which the preferred form of this invention is illustrated.

FIG. 2 is a plan view of the plow shown in FIG. 1.

FIG. 3 is a perspective view of a slightly modified reversible disk plow incorporating the principles of this invention, the plow incorporating a subframe lock and a width adjusting stop.

Figure 1:
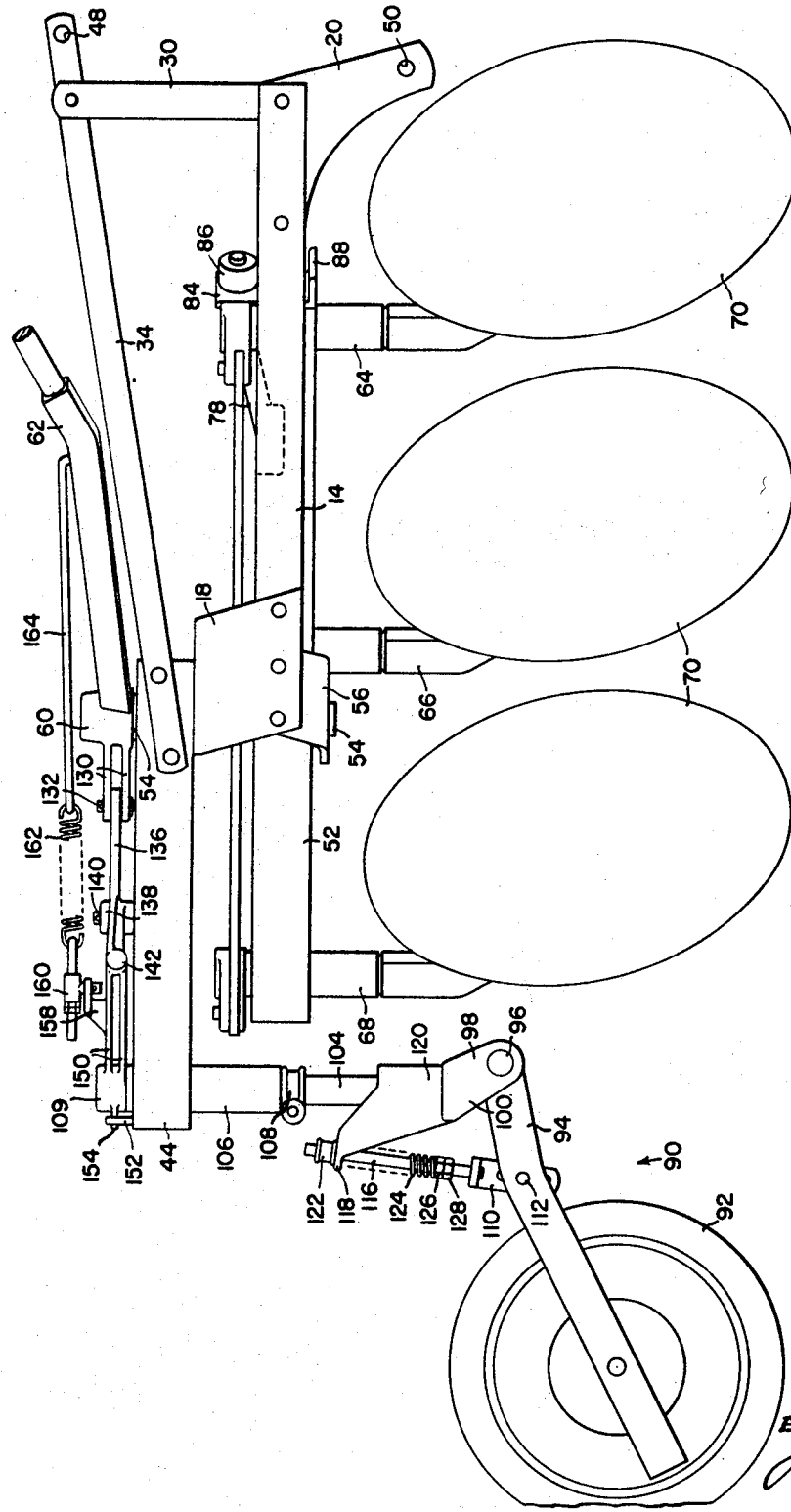
FIG. 1 is a side elevation view of a three-bottom reversible disk plow in which the principles of the present invention have been incorporated.

In the following description, right-hand and left-hand reference is determined by standing to the rear of the reversible disk plow and facing the direction of travel.

Referring now to FIGS. 1 and 2, the reversible disk plow of this invention has a main frame indicated generally at 10 and a swingable subframe indicated generally at 12. The main frame is formed with right and left side rails 14 and 16, respectively, the side rails being secured at their rear ends to each other by means of a transversely extending plate member 18. The forward ends of the side rails 14 and 16 are interconnected by a transversely extending frame structure which includes right-and left-hand hitch plates 20 and 22, respectively, an arcuate support rail 24 having forwardly extending right-and left-hand ends 26 and 28, and a hitch frame having right and left upwardly extending frame members 30, 32 which are secured at their upper ends to right- and left-hand braces 34, 36. The lower outer ends of the members 30, 32 are secured to right and left reinforcing plates 38, 40 which are secured in a conventional manner to the forward ends of the outer rails 14, 16, the forward ends of the arcuate rail 24 and to the right and left hitch plates 20, 22. Disposed between the reinforcing plates 38, 40 is a brace 42.

A rearwardly extending box beam is rigidly secured to the upper surface of the transversely extending plate member 18. Secured on opposite sides of the forward end of the box beam 44 are the rear ends of the braces 34, 36. A reinforcing member 46 is disposed between the ends of the braces 34, 36 and maintains the forward ends of the braces a fixed distance apart from each other. The forward ends are apertured, as at 48, and hitch pin means may be disposed within the apertures 48. The lower ends of the right and left hitch plates 20, 22 are also suitably apertured for the reception of hitch pin means to which the lower draft links of a tractor may be secured, the apertures within the plates being indicated by the numeral 50. The disk plow of the present invention is adapted to be propelled forwardly by a tractor which is provided with generally conventional lower draft links which are secured to the hitch pins disposed within the apertures 50 and also having an upper compression link which is disposed about a hitch pin that is positioned within the apertures 48, the foregoing manner of attachment being generally conventional and not shown in the drawings.

The subframe 12 includes a generally longitudinally extending box beam member 52 which is apertured and receives a spindle 54 which is rigidly secured thereto. The lower end of the spindle 54 is journaled within a transverse strap 56 carried by the main frame 10 and the upper end of the spindle 54 is journaled within apertures in the transversely extending plate member 18 and the box beam 44 of the main frame. Keyed about the upper end of the spindle 54 is a cap member 60 which carries a forwardly extending handle member 62. To swing the subframe from its right plowing position shown in FIG. 2 to the left plowing position, it is only necessary to lift the plow out of engagement with the ground by means of the tractor links and to swing the handle 62 to the left.

A plurality of disk plow standards 64, 66, 68 are journaled for rotation within the box beam member 52. Each of these standards carries at its lower end a plowing disk 70. An outwardly projecting arm 72 is rigidly secured to the upper end of each standard 64, 66, 68 above the box beam member 52. The outer ends of the arms 72 are apertured and receive a pin which is also received within apertured portions of an interconnecting link 76 to interconnect all of the standards for simultaneous movement.

To rotate the standards 64, 66, 68 as the beam 52 is swung from its right to left plowing positions, and vice versa, a crank 78 is fixed to the upper portion of the forward spindle 64. This crank is provided with right and left rearwardly extending arms 80, 82 which are disposable between the box beam 52 and the side rails 14, 16. Thus when the box beam is in its right-hand plowing position shown in FIG. 2, the right arm 80 is disposed between and in contact with the right side rail 14 and the box beam 52. Similarly, when the box beam is in its left-hand position, the left arm 82 is disposed between and is in contact with the left side rail 16 and the left side of the box beam 52. When, in either of these positions, the plow is being propelled forwardly, the soil pressure will normally hold the subframe in its plowing position.

The forward end of the box beam 52 is supported on the arcuate rail 24 by means of a support member 84 which is secured to the forward end of the box beam 52, the support member 84 being provided with an upper roller 86 that is adapted to rest upon the top surface of the arcuate rail 24, and a lower forwardly projecting flange 88.

The rear end of the main frame assembly carries a furrow wheel assembly indicated generally at 90. The assembly 90 includes a furrow wheel 92 journaled for rotation between two spaced apart arms 94 that are pivotally disposed at their forward ends about a transversely extending pin 96 carried by downwardly projecting ears 98 of a U-shaped member 100 whose transverse bight portion 102 is rigidly secured to a shaft 104. The shaft 104 is received within a sleeve 106 fixed within the box beam member 44. Also mounted on the shaft 104 is a clamp collar 108 which is secured directly below the sleeve 106, and a structure 109 is keyed to the upper end of the shaft 104 above the box beam member 44.

The rear furrow wheel 92 is spring loaded and of adjustable height. To this end a bracket 110 is pivotally secured to the spaced apart arms 94 by means of a pin 112, the bracket being secured in its upper end portion 114 to an upwardly projecting rod 116. The upper end of the rod 116 is received within the bight portion 118 of a member 120 rigidly secured to the shaft 104. A clamp collar 122 is secured to the rod 116 above the bight 118, and a spring 124 is disposed about the rod 116 between the bight 118 and adjusting and jam nuts 126, 128, respectively. The depth of the furrow wheel is adjusted through means of the clamp collar 122 and the spring pressure is increased or decreased by positioning the adjusting and jam nuts 126, 128 as desired.

When the subframe 12 is swung from one plowing position to the other, interconnecting linkage causes the angle of the rear furrow wheel to be changed automatically. This linkage includes a rearwardly extending link member 130 fixed rigidly at its forward end to the cap member 60. The rear ends of the link member 130 carry a pin 132 which is disposable within a slot 134 of a forwardly extending arm 136 carried by a structure 138 rotatably carried by a pivot post 140, the rear end of which is carried by the box beam 44. The structure 138 includes right and left rearwardly extending arms 142, 144, each of which carries right and left adjustable stops 146, 148. A forwardly extending link 150 is carried by the structure 109, the forward ends of the link 150 being contactable by the right and left stops 146, 148.

From the foregoing it should be obvious that as the subframe is swung from one position to the other, the rear furrow wheel 92 will be automatically angled by the interaction of the links and arms 130, 136, 142, 144, and 150. The angle of the rear wheel can be adjusted by means of the lead adjusting screws or stops 146, 148. To increase the wheel lead angle, the stops 146, 148 are advanced toward each other. Similarly, to reduce the lead, the stops are moved away from each other.

To limit the maximum degree of lead permissible, a U-shaped member 152 is provided which has upwardly extending legs contactable by a rearwardly projecting lug 154 on the structure 109.

To assist in indexing the subframe from one position to the other position, a spring is provided which interconnects the handle 62 with the rear furrow wheel swinging means. More specifically, an upwardly projecting lug 158 is formed on the forwardly extending link 150, the lug 158 receiving the structure 160 to which the rear end of a spring 162 is secured. The forward end of the spring 162 is secured to the handle 62 by means of a link 164. Thus when the subframe is indexed from one side to the other, the operator will engage the handle to swing the subframe to a neutral position in which the box beam 52 is disposed substantially below the braces 34, 36, this being a neutral position, and thereafter the spring will assist in further movement toward the desired side.

In FIG. 3 a slightly modified plow frame is shown. In this modified form of frame the right and left reinforcing plates 38, 40 are not employed and the forward ends of the arcuate rail 24 are disposed adjacent the forward ends of the rails 14, 16, the upper ends of the hitch plates 20, 22 being disposed inwardly of the ends 26, 28 and secured directly to the right and left frames 30, 32. In FIG. 3, a further feature of this invention is also illustrated, this being the subframe lock. As pointed out above, in average or normal soil conditions, the soil pressure will hold the subframe in its normal right- or left-hand working position. However, if the subframe has a tendency to rotate to the neutral position in tough heavy soil conditions, a subframe lock 170 is employed. The subframe lock is adapted to conform with the rail 24 and is provided with two generally vertically extending slots which receive bolts 172 to hold the subframe lock in position. The subframe lock is adjusted to project approximately one-eighth inch above the arcuate rail 24 in which position it is contacted by the roller 86, holding the roller from movement towards the middle.

A further feature of this invention which is also illustrated in FIG. 3 is the provision of width adjusting stops. These stops 174 are mounted within the arms 80, 82 and project outwardly therefrom. Thus when the stops 174 are employed, the beam 52 cannot approach the side rail 14 or 16 as closely as when they are not used. Thus when the plow is used in the wide cut position, the width adjusting stops 174 are not used; however when the plow is used in the narrow cut position, the width adjusting stops are inserted in the holes in the disk indexing crank 78 as shown in FIG. 3. It should be noted that the subframe lock is provided with a long leg 176 and a short leg 178. The long leg of the lock must be up when the wide cut is used, and the short leg of the lock must be up when the narrow cut is used.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. A reversible disk plow including a main frame, a subframe carried on said main frame for swinging movement between right-hand and left-hand working positions, means to swing said subframe from one working position to the other, a plurality of disk plow standards journaled on the subframe for rotational movement between two positions, the combination therewith of means to rotate said disk standards from one rotational position to the other rotational position in response to swinging of the subframe from one working position to the other working position, said rotating means including means linking the standards for simultaneous rotational movement, a disk standard rotating means mounted on the subframe for movement betwen two positions, said disk standard rotating means being provided with two opposed surfaces, one of the two opposed surfaces being in contact with one portion of the main frame when the subframe is in its right-hand working position to hold the disk standard rotating means in one of its two positions, the other of the two opposed surfaces being in contact with another portion of the main frame when the subframe is in its left-hand working position to hold the disk standard rotating means in the other of its two positions, and means interconnecting the disk standard rotating means with the standard linking means whereby the standards will be caused to rotate from one rotational position to the other rotational position in response to swinging movement of the subframe from one working position to the other working position.

2. A reversible disk plow including a main frame having spaced apart side rails and a transversely extending frame member interconnecting the rear ends of the side rails, a subframe having a vertically extending spindle journaled within the transversely extending frame member for swinging movement between right-hand and left-hand working positions, means to swing the subframe from one working position to the other; a plurality of disk plow standards journaled on the subframe for rotational movement about generally vertically extending axes between two positions; means to rotate said standards from one rotational position to another rotational position, said rotating means including means linking the standards for simultaneous rotational movement, a disk standard rotating crank mounted on the subframe for movement between two positions, said crank being provided with two opposed surfaces, one of the two opposed surfaces being in contact with one side rail when the subframe is in its right-hand working position to hold the crank in one of its two positions, the other of the two opposed surfaces being in contact with the other side rail when the subframe is in its left-hand working position to hold the crank in the other of its two positions, and means interconnecting the crank with the standard linking means whereby the standards will be caused to rotate from one to another of two positions in response to swinging movement of the subframe from one working position to the other working position.

3. A reversible disk plow including a main frame having spaced apart side rails, a transversely extending frame member interconnecting the rear ends of the side rails; and an arcuate support rail interconnecting the forward ends of the side rails, a subframe having a generally longitudinally extending beam, a vertically extending spindle mounted on the beam and journaled within the transversely extending frame member for swinging movement of the beam right-hand and left-hand working positions, and a support member on the forward end of the beam normally in contact with the upper surface of the arcuate support; means mounted on said spindle to swing the subframe from one working position to the other; a plurality of disk plow standards journaled on the beam for rotational movement about generally vertically extending axes between two positions; means to rotate said standards from one rotational position to another rotational position, said rotating means including means linking the standards for simultaneous rotational movement, a disk standard rotating crank mounted on the beam for movement between two positions, said crank being provided with two opposed surfaces, one of the two opposed surfaces being in contact with one side rail when the beam is in its right-hand working position to hold the crank in one of its two positions, the other of the two opposed surfaces being in contact with the other side rail when the beam is in its left-hand working position to hold the crank in the other of its two positions, and means interconnecting the crank with the standard linking means whereby the standards will be caused to rotate from one to another of two positions in response to swinging movement of the subframe from one working position to the other working position.

4. The invention set forth in claim 3 further characterized by the provision of a subframe lock mounted on the arcuate support, said lock having a portion engageable by the support member.

5. The invention set forth in claim 3 further characterized by the provision of spring means to bias the generally longitudinally extending beam from a neutral position into one of the right-hand or left-hand positions, said spring means being secured at one end to a portion of the main frame to the rear of the vertically extending spindle, and the spring being interconnected at the other end with the subframe forwardly of the vertically extending spindle.

6. A reversible disk plow including a main frame having spaced apart side rails and a transversely extending frame member interconnecting the rear ends of the side rails, a subframe having a vertically extending spindle journaled within the transversely extending frame member for swinging movement of the subframe between right-hand and left-hand working positions, means to swing the subframe from one working position to the other, a plurality of disk plow standards journaled on the subframe for rotational movement between two positions, means to rotate said standards from one rotational position to another rotational position in response to swinging of the subframe from one working position to the other working position, said rotating means including means linking the standards for simultaneous rotational movement, a disk standard rotating crank mounted on the forward disk plow standard for movement between two positions of rotation, said crank being provided with two radially outwardly extending members, one of the two outwardly extending members being disposed between and in contact with one side rail and one side of the subframe when the subframe is in its right-hand working position to hold the crank in one of its two positions, the other of the two outwardly extending members being disposed between and in contact with the other side rail and the other side of the subframe when the subframe is in its left-hand working position to hold the crank in the other of its two positions, and means interconnecting the crank with the standard linking means whereby the standards will be caused to rotate from one to another of two positions.

7. The invention set forth in claim 6, further characterized by the provision of width adjusting stops mounted on the outwardly extending members to reduce the swing of the subframe from one working position to the other working position causing the plow to be in a narrow cut position.

8. A reversible disk plow including a main frame, a subframe having a vertically extending spindle journaled within the main frame for swinging movement between right-hand and left-hand plowing positions, means to swing said subframe between working positions, a rear furrow wheel carried for rotation on vertically extending shaft means journaled for swinging between two lead positions within the rear end of the main frame, a forwardly extending link mounted on said shaft means, a pivot post on said main frame between said spindle and said shaft means, a structure rotatably mounted on said pivot post, said structure being provided with a slotted forwardly extending arm and two rearwardly extending arms, each of the rearwardly extending arms being provided with adjustable stops contactable with said forwardly extending link, and a rearwardly extending link mounted on said spindle, said link being provided with pin means engageable within said slot, the parts being so arranged and constructed that rotation of the subframe between plowing positions will cause the furrow wheel to swing between lead positions.

9. A reversible disk plow including a main frame having a pair of side rails, a subframe having a spindle journaled on said main frame for swinging movement between right-hand and left-hand working positions, means to swing said subframe from one working position to the other, a plurality of disk plow standards journaled on the subframe for rotational movement between two positions, means linking the standards for simultaneous rotational movement, and a crank rotatably mounted on one of the standards and having arms selectively engageable with the side rails when the subframe is in one of its working positions to hold the disk standards in one of their two positions.

10. The invention set forth in claim 9 further characterized by the provision of a rear furrow wheel carried for rotation on vertically extending shaft means journaled for swinging between two positions within the rear end of the frame, and means interconnecting said spindle with said shaft to cause said shaft to rotate between positions in the same direction as said spindle when said spindle is rotated between positions, said interconnecting means including adjustable stops whereby the rotational positions of the shaft may be varied within the two positions.

11. The invention set forth in claim 10 in which spring means is provided to bias the subframe to one of its two working positions from a neutral position, said spring being secured at one end to the subframe swinging means and said spring being secured at the other end to the means interconnecting the spindle and the shaft.

12. A reversible disk plow including a main frame, a subframe having a vertically extending spindle journaled within the main frame for swinging movement between right-hand and left-hand plowing positions, means to swing said subframe between working positions, a rear furrow wheel carried for rotation on vertically extending shaft means journaled for swinging between two lead positions within the rear end of the main frame, a forwardly extending link mounted on said shaft means, a rearwardly extending link mounted on said spindle for movement therewith, arm means pivotally mounted on said main frame between said spindle and said shaft means, a forward portion of said arm means being interconnected with said rearwardly extending link means, and means adjustably interconnecting the rearward portion of said arm means with said forwardly extending link means for independent adjustment of the left and right lead angles of the rear furrow wheel, the parts being so arranged and constructed that rotation of the subframe between plowing positions will cause the furrow wheel to swing between adjusted lead positions.

References Cited

UNITED STATES PATENTS

| | | | |
|---|---|---|---|
| 2,723,612 | 11/1955 | Morkoski | 172—212 X |
| 2,824,505 | 2/1958 | Coviello | 172—222 X |
| 2,949,161 | 8/1960 | Campbell | 172—222 X |
| 3,042,120 | 7/1962 | Heckathorn et al. | 172—212 |
| 3,045,765 | 7/1962 | Cox et al. | 172—222 X |

ABRAHAM G. STONE, *Primary Examiner.*

J. R. OAKS, *Assistant Examiner.*

UNITED STATES PATENT OFFICE
CERTIFICATE OF CORRECTION

Patent No. 3,390,726

July 2, 1968

Bruno B. Johannsen

It is certified that error appears in the above identified patent and that said Letters Patent are hereby corrected as shown below:

Column 5, line 19, "betwen" should read -- between --; line 71, after "beam" insert -- between --.

Signed and sealed this 13th day of January 1970.

(SEAL)
Attest:

Edward M. Fletcher, Jr.
Attesting Officer

WILLIAM E. SCHUYLER, JR
Commissioner of Patents